Oct. 29, 1929.  F. SHORT  1,734,022
ILLUMINATING SYSTEM
Filed Sept. 26, 1921
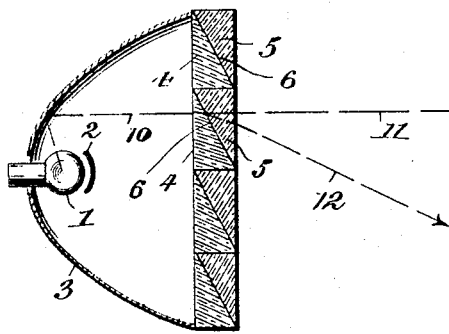
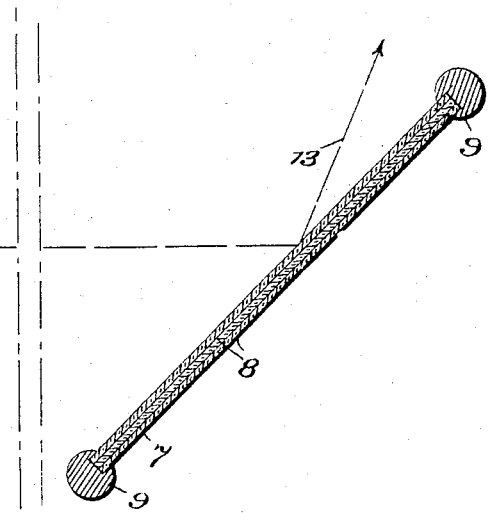
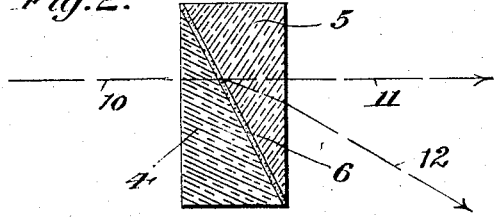
Inventor
Frank Short,
By Dodge and Sons,
Attorneys Patented Oct. 29, 1929

1,734,022

UNITED STATES PATENT OFFICE

FRANK SHORT, OF PENN YAN, NEW YORK, ASSIGNOR, BY DIRECT AND MESNE ASSIGNMENTS, OF ONE-HALF TO JOHN J. SERRELL, OF ELIZABETH, NEW JERSEY, AND ONE-HALF TO ROBERT A. SMITH, OF MAHWAH, NEW JERSEY

ILLUMINATING SYSTEM

Application filed September 26, 1921. Serial No. 503,275.

This invention relates to methods of and apparatus for protecting persons from the glare produced by light sources of great intensity. Though applicable to intense lights in general, the invention is expected to offer its greatest utility in giving protection from light projectors, such for example as search lights and headlights, and will be described, for illustrative purposes, as applied to automobiles.

The method involves the plane polarization of light leaving the source, and observation of the field of view through a screen which cuts off the above mentioned polarized light but will transmit certain components of other impinging light not plane polarized in the same plane. Such a screen may, and preferably does consist of a plane polarizing medium whose plane of polarization is perpendicular to the plane of polarization of the polarized light. Since plane polarized light is modified, and deprived of its plane polarization by diffuse reflection, the polarized light beams from the projector although invisible or only dimly visible through the screen, nevertheless so illuminate the field of view as to render it clearly visible through the screen.

The invention is susceptible of a further refinement through the use of a double image prism or prisms as the polarizing means, such prism or prisms serving to split the light leaving the source into two divergent components, polarized in planes respectively perpendicular to each other. Thus it becomes possible to produce a directly projected beam of substantially parallel rays in which the light is polarized in one plane (vertical by preference) and a downwardly directed flood of rays in which the light is polarized in a plane perpendicular to the plane of polarization of the beam (i. e. horizontal where the beam is polarized in a vertical plane).

In such a case the protecting screen should be substantially impervious to light polarized in a vertical plane but should transmit certain components of unpolarized light or of light having components not polarized in one certain plane. Remembering that polarized light is modified by diffuse reflection in such a way that it is no longer polarized in one plane it will be observed that such an arrangement, while protecting the observer from the direct beam, causes the field of view to be visibly illuminated by the beam and also by the downwardly deflected, horizontally polarized light, so that so far as illumination of the field of view is concerned the system is efficient in its use of light.

As applied in practice the invention contemplates the application to all intense light sources of polarizing means serving to polarize the light in the same sense and the use of screens impervious to light so polarized.

In the accompanying drawings I illustrate the principle of the invention by diagrams. In the drawing,—

Fig. 1 is a diagram illustrating the light projector and one form of polarizer and one form of light screen in section. On this diagram the paths of light rays are indicated by broken lines.

Fig. 2 is a section of a polarizing double image prism on an enlarged scale, the double refractive effect of the prism on a light ray being indicated by broken lines.

For reasons involving practical convenience I prefer to polarize the beam in a vertical plane, which means that the vibrations are horizontal, and I shall describe the apparatus as so arranged, though other planes of polarization may be used if preferred.

The light source is indicated at 1 as an ordinary incandescent electric lamp. It preferably is shielded on its front face by a screen 2. The lamp filament is located at or near the focus of a parabolic reflector 3. In lieu of the usual lens I make use of a polarizing screen, in this case shown as made up of a series of horizontally disposed, double image prisms. Each such prism consists of two elements 4 and 5 cemented together at 6.

In the example illustrated the element 4 is a prism of glass whose index of refraction is about the same as the higher index of Iceland spar (approximately 1.65), and the element 5 is a similar prism of Iceland spar cut so that when mounted as shown in the drawings the optic axis is vertical. The cement 6 has an index of refraction substantially the same as that of the glass prism 4.

The purpose of using the glass prisms 4 is to secure at least approximate achromatization, and to avoid deflection of the ray 11 which otherwise would occur, and consequently entail either a changed mounting of the headlight as a whole, or a material change in its construction.

The protective screen indicated generally by the numeral 7 may consist of a series of parallel plates 8 of glass held together by a marginal frame 9 and inclined at the polarizing angle. Such a screen may be constructed as a part of an automobile windshield or may be incorporated in goggles or the like. The convenience of such an inclined polarizing screen is one reason for the preference expressed for polarizing the beam in a vertical plane.

The parts being arranged as described the action is as follows:—

A light ray 10 entering prism element 4 normal to its rear surface is not deflected or separated in its passage through element 4 and cement 6. On entering the Iceland spar prism element 5 those components which become the ordinary ray 11 meet the same optical index as in the glass and cement and hence pass through element 5 undeflected, emerging as a ray vibrating in a plane parallel to the optic axis of element 5 (i. e., horizontal in this case). Those components which become the extraordinary ray 12, however, are vibrating in a vertical plane and within the spar crystal meet the lower index of refraction (approximately 1.48) as they enter the Iceland spar element 5 and hence are deflected toward the base of the glass-cement prism. Obviously it is again refracted downward as it emerges from the Iceland spar into the air. Thus the effect is to produce a beam made up of ordinary rays 11, plane polarized in a vertical plane and a flood of extraordinary rays 12 directed obliquely downward and polarized in a horizontal plane.

Since the rays 11 are plane polarized in a vertical plane the screen 7 excludes them deflecting them as indicated at 13.

Objects illuminated by the rays 12, or by the rays 11, or both, will be visible through screen 7 since both lose their polarization by diffuse reflection.

Thus, while the beam 11 is invisible or substantially invisible through screen 7 a considerable portion of the light from source 1 is effective for illumination of the field of view.

I contemplate the use of any source of polarized light whether this be an original source of such light, or a source of ordinary light with a polarizing screen. In the latter case I may substitute any substantially equivalent uniaxial crystal for Iceland spar, or may use, in lieu of the double image prism described, any polarizing medium, whether or not it is such as to make effective use of the extraordinary ray. While I prefer to use a polarizing medium as the effective element of screen 7, it would fall within the broad scope of my invention to use any screen selectively impervious to rays polarized in a definite sense, whether or not such a screen is or is not technically a polarizing medium.

What is claimed is:—

1. In a view lighting system for vehicles the method of avoiding the glare effect of light directly transmitted from a plurality of light sources, which consists in plane polarizing in the same sense the rays emitted by such sources and observing the field of view through a selective screen which obstructs the pasage of such polarized rays to the observer, while permitting the passage of other rays.

2. In a view lighting system for vehicles the method of avoiding the glare effect of light directly transmitted from artificial sources which consists in dividing the light emanating from such sources into divergent components polarized in respectively different planes and observing the field of view through a screen which obstructs the passage of one of said polarized components.

3. In a view lighting system for vehicles the method of avoiding the glare effect of a light source which consists in dividing the light leaving said source into two divergent components, plane polarized in different planes, directing one of said components toward the observer while deflecting the other component in a harmless direction, and protecting the observer by a screen substantially impervious to the polarized light directed toward him but pervious to other light.

4. In a view lighting system for vehicles the method of avoiding the glare effect of a light beam projected by a light projector, which consists in dividing said beam by double refraction into two divergent components plane polarized in different planes, one of said components being projected as a beam; and protecting the observer by a screen substantially impervious to the light composing such polarized beam, but pervious to other light rays.

5. In a view lighting system for vehicles the combination of a light source, a reflector associated with said light source and serving to project light from said source as a beam composed of substantially parallel rays; a polarizing medium interposed in the path of said beam and comprising a double image polarizing prism structure; and a protective screen substantially impervious to one of the polarized components of the light passing through said polarizing medium but capable of transmitting other light, said protective screen being interposed between the observer and said polarizing medium.

6. In a view lighting system for vehicles the combination of a light source, a reflector associated with said light source and serving to project light from said source as a beam composed of substantially parallel rays; a polarizing medium interposed in the path of said beam and comprising a double image polarizing prism structure; and a protective screen substantially impervious to one of the polarized components of the light passing through said polarizing medium, and comprising a plurality of transparent plates at substantially the polarizing angle.

7. In a view lighting system for vehicles the combination of a light source; light projecting means; a light modifying device comprising a polarizing double refracting element interposed in the path of light leaving said projecting means and serving to divide said light into a plane polarized beam and rays divergent from said beam and polarized in a different sense; and a protective screen substantially impervious to the polarized rays comprising said beam but pervious to other light, said protective screen being interposed between the observer and said light modifying device.

8. The headlight apparatus for automobiles or other vehicles comprising a pair of headlights provided with emission polarizing devices to form a beam of light transmitted ahead of the vehicle and substantially polarized in a definite plane, and polarized light viewing devices adapted to be mounted adjacent the eyes of the driver of the vehicle to substantially cut off light polarized in said plane to thereby minimize the objectionable headlight glare of a similarly equipped approaching vehicle.

9. The headlight for automobiles or other vehicles comprising a lamp and reflector and cooperating polarizing devices to form a substantially polarized reflected beam of light adapted to be transmitted ahead of the vehicle.

10. The automobile headlight comprising a headlight casing provided with a lamp and cooperating polarizing devices to form a substantially polarized beam of light adapted to be transmitted ahead of the vehicle and a downwardly inclined beam of light adapted to be projected toward the road surface under and adjacent the automobile.

11. The apparatus for automobiles and other vehicles comprising adjustable polarized light viewing devices adapted to be mounted on the windshield adjacent the operator of the vehicle and comprising light polarizing means adapted to substantially cut out plane polarized light.

12. The apparatus for automobiles and other vehicles comprising polarized light viewing devices adapted to be mounted adjacent the operator of the vehicle and comprising light polarizing means.

13. The headlight apparatus for automobiles or other vehicles comprising a pair of headlights each provided with polarizing devices to form a substantially vertically polarized reflected beam of light transmitted ahead of the vehicle and a downwardly inclined refracted beam of light illuminating the road surface under and adjacent the automobile and polarized light viewing devices through which the driver of the vehicle can look and adapted to substantially cut off light polarized in a vertical plane to thereby eliminate the objectionable glare of the headlights of a similarly equipped approaching vehicle.

14. The headlight apparatus for automobiles or other vehicles comprising a headlight provided with polarizing devices to form a substantially vertically polarized reflected beam of light transmitted ahead of the vehicle and polarized light viewing devices through which the driver of the vehicle can look and adapted to substantially cut off light polarized in a vertical plane to thereby eliminate the objectionable glare of the headlights of a similarly equipped approaching vehicle.

15. The headlight apparatus for automobiles or other vehicles comprising a headlight provided with emission polarizing devices to form a beam of light transmitted ahead of the vehicle and substantially polarized in a definite plane, and polarized light viewing devices adapted to substantially cut off light polarized in said plane to thereby minimize the objectionable headlight glare of a similarly equipped approaching vehicle.

16. The headlight apparatus for automobiles or other vehicles comprising means adapted to be mounted on the vehicle to produce a beam of light transmitted ahead of the vehicle and substantially polarized in a definite plane and polarized light viewing devices adapted to be mounted so that the driver of the vehicle can look through them to substantially cut off light polarized in said plane to thereby minimize the objectionable glare of the headlights of a similarly equipped approaching vehicle.

17. The light apparatus for automobiles, boats and other vehicles comprising a light provided with emission polarizing devices to form a beam of light which is substantially polarized in a definite plane, and polarized light viewing devices adapted to substantially cut off light polarized in said plane to thereby minimize the objectionable glare from another similarly equipped vehicle.

18. The light apparatus for automobiles, boats and other vehicles comprising means adapted to be mounted on the vehicle to produce a beam of light which is substantially polarized in a definite vertical plane and polarized light viewing devices adapted to be mounted so that a person on the vehicle can look through them to substantially cut off light polarized in said plane to thereby minimize the objectionable glare from another similarly equipped vehicle.

19. The light apparatus for automobiles, boats and other vehicles comprising means adapted to be mounted on the vehicle to produce a beam of light transmitted from the vehicle and substantially polarized in a definite plane and polarized light viewing devices adapted to be mounted so that a person on the vehicle can look through them and comprising an angularly adjustable polarizing device to substantially cut off light polarized in said plane to thereby minimize the objectionable glare of the headlights of a similarly equipped approaching vehicle.

20. The headlight apparatus for automobiles or other vehicles comprising a pair of headlights provided with emission polarizing and cooperating diffusing devices to form a beam of light transmitted ahead along the route of the vehicle and substantially polarized in a definite plane.

21. The automobile headlight comprising a headlight casing provided with a lamp and cooperating polarizing and diffusing devices to form a substantially polarized beam of light adapted to be transmitted ahead of the vehicle and a downwardly inclined beam of light adapted to be projected toward the road surface under and adjacent the automobile.

22. The headlight for automobiles or other vehicles comprising a lamp and cooperating polarizing and diffusing devices to form a substantially polarized beam of light adapted to be transmitted forward to illuminate objects along the route of the vehicle.

23. The headlight apparatus for automobiles or other vehicles comprising polarized light viewing devices adapted to be mounted adjacent the eyes of the driver of the vehicle and comprising angularly adjustable polarizing means adapted to substantially cut out plane polarized light.

24. The headlight apparatus for automobiles or other vehicles comprising polarized light viewing devices adapted to be mounted adjacent an operator of the vehicle and comprising angularly adjustable polarizing means adapted to substantially cut out plane polarized light.

25. The headlight apparatus for automobiles or other vehicles comprising polarized light viewing devices adapted to be mounted adjacent an operator of the vehicle and comprising polarizing means adapted to substantially cut out plane polarized light.

26. The headlight apparatus for automobiles, boats and other vehicles comprising a light and cooperating emission polarizing devices to project forward along the route of the vehicle a beam of light which is substantially polarized in a definite plane, and polarized light viewing devices adapted to be mounted on the vehicle adjacent the operator of the vehicle and comprising angularly adjustable polarizing means adapted to substantially cut off light polarized in said plane to thereby minimize the objectionable glare from another similarly equipped vehicle.

27. The headlight apparatus for automobiles, boats and other vehicles comprising a light and cooperating emission polarizing devices to project forward along the route of the vehicle a beam of light which is substantially polarized, and polarized light viewing devices adapted to be mounted adjacent the operator of the vehicle and comprising polarizing means adapted to substantially cut off similarly polarized light to thereby minimize the objectionable glare from another similarly equipped vehicle.

28. In a view lighting system for vehicles the method of avoiding the glare effect of light which consists in illuminating by means of a source of plane polarized light and observing the field of view through a selective screen which obstructs the passage of such polarized light to the observer while permitting the passage of other light.

29. In a view lighting system for vehicles the method of avoiding the glare effect of light directly transmitted from artificial light source which consists in plane polarizing the light rays emitted by such source and observing the field of view through a selective screen which obstructs the passage of such polarized rays to the observer while permitting the passage of other rays.

30. In a view lighting system for vehicles the method of avoiding the glare effect of a light beam projected by a light projector, which consists in plane polarizing the light rays composing such beam and observing the field of view through a selective screen which obstructs the passage to the observer of such polarized rays while permitting the passage of other rays.

31. In a view lighting system for vehicles the combination of a light source; means for plane polarizing light interposed in the path of light from said source; and a protective screen substantially impervious to the light so polarized but capable of transmitting such light when modified by diffuse reflection through an object illuminated by said polarized beam.

32. In a vehicle, a system for illuminating and viewing the pathway of the vehicle comprising, a source of light having certain selective characteristics, and selectively absorbing means carried in the vehicle for selectively absorbing selective characteristic light from another vehicle projected in directions approximately opposite to that of the light from the first source.

33. In a vehicle, a system for illuminating and viewing the pathway of the vehicle comprising, a source of projected functionally-selective light, and functionally cooperating light-analyzing means arranged for viewing approximately in the same direction as said projected light.

34. In a vehicle, a lighting system for illuminating the pathway of the vehicle comprising, a source of light, means for polarizing said light in a plane at any angle to the horizontal, and means for transmitting polarized light.

35. In a vehicle, a lighting system for illuminating the pathway of the vehicle comprising, a source of light, means for polarizing said light in a plane at any angle to the horizontal.

36. In a vehicle, a lighting system for illuminating the pathway of the vehicle comprising, a source of polarized light.

37. In a vehicle, a lighting system for illuminating the pathway of the vehicle, and means for at least partially absorbing polarized light not optically coincident with the plane of polarization of said means.

38. In a vehicle, a viewing means for selectively absorbing or transmitting light coming toward the vehicle according to the selective characteristics of said light.

39. In a vehicle, a viewing means for selectively absorbing or transmitting polarized light coming toward the vehicle, as determined by its plane of polarization.

40. In an automobile or other vehicle, the method of avoiding the glare effect of light which consists of illuminating the field of view by selected functionalized beams of light, and observing the field of view through viewing means having selective functions of cooperating selective nature.

41. In an automobile or other vehicle, the method of avoiding the glare effect of light which consists of illuminating the pathway by distinctive quality beams of light, and screening an observer from other distinctive quality beams of light by at least partially preventing the transmission of such other beams of light by a screen having distinctive quality selective features of a cooperating selective nature.

42. In a vehicle, a lighting system for illuminating the pathway of the vehicle comprising, a source of polarized light, polarized light viewing means, the plane of polarization of the polarized light forming an angle with the vertical equal to the angle formed with the horizontal by the plane of polarization of the polarized light viewing means.

In testimony whereof I have signed my name to this specification.

FRANK SHORT.